United States Patent Office 3,424,656
Patented Jan. 28, 1969

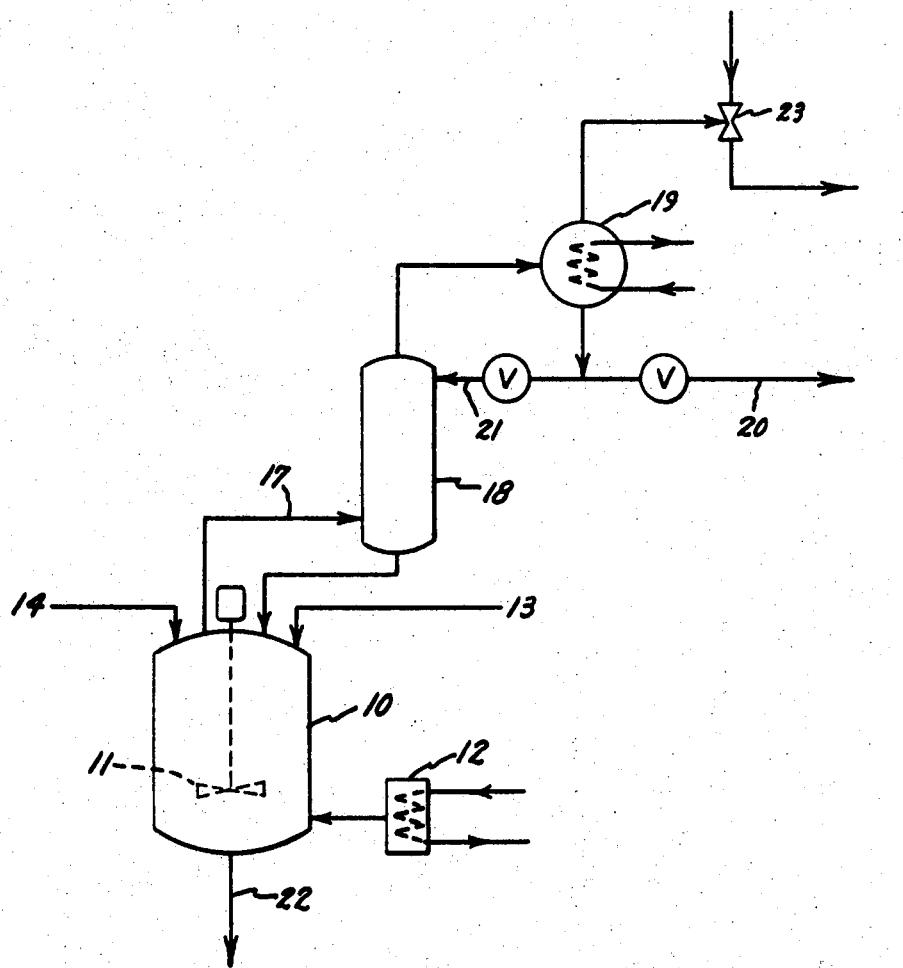

3,424,656
METHOD FOR RECOVERING ORGANOALKOXY-SILANES BY DISTILLATION WITH A BASE CATALYST
Abe Berger, Schenectady, N.Y., assignor to General Electric Company, a corporation of New York
Filed Mar. 25, 1966, Ser. No. 537,274
U.S. Cl. 203—36      9 Claims
Int. Cl. B01d 3/34

ABSTRACT OF THE DISCLOSURE

A method is provided for recovering certain organofunctional alkylalkoxysilanes such as cyanoalkylalkoxysilanes and aminoalkylalkoxysilanes from alkoxysilane mixtures contaminated with carbalkoxyalkylalkoxysilanes. An alkoxysilane mixture contaminated with a carbalkoxyalkylalkoxysilane and comprising an organofunctional alkylalkoxysilane such as a cyanoalkylalkoxysilane is distilled in the presence of a base catalyst and the cyanoalkylalkoxysilane is recovered as an overhead fraction.

---

The present invention relates to a method of separating certain organofunctionalalkylalkoxysilanes such as cyanoalkylalkoxysilanes from alkoxysilane mixtures contaminated with carbalkoxyalkylalkoxysilanes.

Prior to the present invention various methods were known for making organofunctionalalkylalkoxysilanes of the formula, (1) 

where R is selected from monovalent hydrocarbon radicals and halogenated monovalent hydrocarbon radicals, R' is selected from cyanoalkyl radicals and aminoalkyl radicals, R" is selected from alkyl radicals, $a$ is a whole number equal to 0 to 2, inclusive, $b$ is an integer equal to 1 to 3, inclusive, and the sum of $a$ and $b$ is equal to 1 to 3, inclusive. One method for example, involved the reaction between a cyanoalkylhalosilane and an aliphatic monohydric alcohol in accordance with the following equation,

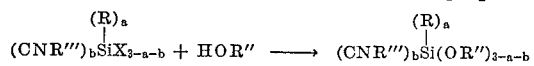

where R, R", $a$ and $b$ are as defined above and R''' is a divalent alkylene radical having from 2 to 8 carbon atoms.

As taught in Schubert Patent 3,008,975, the alkoxylation of cyanoalkylhalosilane can result in the production of hydrogen chloride. Those skilled in the art know that hydrogen chloride in combination with alcohol can readily convert cyanoalkyl radicals to carbalkoxyalkyl radicals. As a result, there also can be produced during the alkoxylation of cyanoalkylhalosilane, minor amounts such as up to about 10 mole percent or more based on the total moles of alkoxysilane, of the corresponding carbalkoxyalkylalkoxysilane,

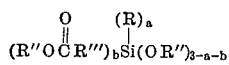

A build-up in ester concentration can render the cyanoalkylalkoxysilane unsuitable as an intermediate for making cyanoalkylpolysiloxanes or other organofunctional alkoxysilane such as aminoalkylalkoxysilane which can be made by reduction of the cyanoalkylalkoxysilane. Experience has shown that even though the hydrolysis of the nitrile radical can be minimized by Schubert's method of reducing the hydrogen chloride concentration, invariably the cyanoalkylalkoxysilane produced thereby is contaminated with at least 5 mole percent or more of carbalkoxyalkylalkoxysilane based on the total moles of organocyanoalkylalkoxysilane and carbalkoxyalkylalkoxysilane. Efforts to remove the ester contaminant by standard methods such as by distillation, etc., have been found to be unsuccessful since the boiling point of the carbalkoxyalkylalkoxysilane and the cyanoalkylalkoxysilane are substantially the same.

It has now been discovered that organofunctionalalkoxysilanes, such as cyanoalkylalkoxysilanes, can be recovered free of contamination from alkoxysilane mixtures containing carbalkoxyalkylalkoxysilanes, by heating such alkoxysilane mixtures in the presence of an effective amount of a base catalyst selected from $(R'')_4\text{NOQ}$, $(R'')_4\text{POQ}$, and a metal catalyst of the formula, (2)      $M(X)_a$ where Q is selected from H and an R" radical, M is a metal selected from Group I alkali metals and Group II alkaline earth metals, X is selected from OY, and $$NY_{2-b}(Z)_b$$

Y and Z are selected from Q, $SiR''_3$, and $GeR''_3$, and $a$ and $b$ are whole numbers equal to 0 to 2, inclusive.

Based on the above discovery, there is provided by the present invention, a method of distilling an alkoxysilane mixture comprising (A) an organofunctionalalkylalkoxysilane, and (B) a carbalkoxyalkylalkoxysilane to provide for the production of an overhead fraction comprising (A) which is substantially free of (B), which method comprises (1) distilling said alkoxysilane mixture in the presence of an effective amount of a base catalyst and (2) recovering an overhead fraction boiling within the temperature range of (A) which is selected from a cyanoalkylalkoxysilane and an aminoalkylalkoxysilane.

Radicals included by R of Formula 1 are for example, aryl radicals and halogenated aryl radicals such as phenyl, chlorophenyl, tolyl, xylyl, naphthyl, etc.; aralkyl radicals such as phenylethyl, benzyl, etc.; aliphatic, haloaliphatic, and cycloaliphatic radicals such as alkyl radicals, for example, methyl, ethyl, trifluoropropyl, butyl, pentyl, octyl, etc.; cyclohexyl, cycloheptyl, etc. Radicals included by R' are for example, cyanoalkyl radicals such as cyanoethyl, cyanopropyl, cyanobutyl, cyanopentyl, cyanohexyl, etc.; aminoalkyl radicals such as aminopropyl, aminobutyl, aminohexyl, aminooctyl, etc. Radicals included by R" are for example, all of the alkyl radicals and haloalkyl radicals included by R. In the above formula, where R, R' and R" can represent more than one radical, these radicals can be all the same or any two or more of the aforementioned radicals respectively.

Cyanoalkylalkoxysilanes shown by Formula 1 are for example, beta-cyanoethyltriethoxysilane, beta-cyanoethylmethyldiethoxysilane, gamma-cyanopropyldimethylethoxysilane, gamma-cyanopropylmethyldiethoxysilane, beta-cyanoethyltrimethoxysilane, gamma-cyanopropylmethyldi-n-propoxysilane, etc.

Aminoalkylalkoxysilanes shown by Formula 1 are for example, gamma-aminopropyltriethoxysilane, gamma-aminopropylmethyldimethoxysilane, gamma-aminobutyltriethoxysilane, omega-aminobutyldimethylethoxysilane, etc.

Base catalysts which can be employed in the practice of the invention are preferably metal catalysts shown by Formula 2, which include for example, alkoxides of alkali metals such as sodium, potassium, rubidium and cesium, etc.; alkali metal hydroxides such as sodium hydroxide, potassium hydroxide, lithium hydroxide, etc.; alkali metal amides such as sodium amide, silanolates of alkali metals as sodium trimethylsilanolate, etc., N,N-diethylsodium amide, lithium hexamethyldisilylamide, etc. In addition, alkaline earth metal compounds such as magnesium N,N-diethylamide, barium hydroxide, calcium amide, magnesium methoxide, calcium bis(hexamethyldisilylamide), etc., also can be employed. In addition to the aforementioned metal catalysts there are also included quaternary ammonium catalysts such as benzyltrimethyl ammonium hydroxide, tetraethyl ammonium hydroxide, tetramethyl ammonium methoxide, etc., quaternary phosphorous catalysts, such as tetrabutyl phosphonium hydroxide, benzyl triethyl phosphonium hydroxide, etc.

In the practice of the invention, a mixture of an organofunctionalalkylalkoxysilane and a carbalkoxyalkylalkoxysilane hereinafter referred to as the "alkoxysilane mixture" is heated in the presence of a base catalyst to provide for the separation of an overhead product which is substantially free of the carbalkoxyalkylalkoxysilane, which hereinafter will be designated as the "ester." The overhead product which is recovered, consists essentially of the organofunctionalalkylalkoxysilane or "organofunctionalsilane" which hereinafter can designate either a cyanoalkylalkoxysilane, "cyanoalkylsilane" or an aminoalkylalkoxysilane, "aminosilane."

The preferred method of practicing the present invention is further illustrated by the attached drawing; 10 is a pressure vessel having an agitator 11, and a heat exchanger 12. Crude alkoxysilane is charged to 10 through line 13, and basic catalyst is introduced through line 14; after the alkoxysilane has been sufficiently agitated, vapor from 10 passes through an enriching column 18 through line 17; it is condensed in exchanger 19. If a vacuum distillation is required, the vacuum is provided by a suitable vacuum pump or jet ejector 23. Condensed ester free product from 19 can be divided into a product stream 20 and reflux stream 21. The distillation is continued until substantially all the product in the initial charge has been recovered as product through 20. Line 22 is for recovering residue product.

The alkoxysilane mixture can be made by alkoxylating a cyanoalkylhalosilane with an aliphatic monohydric alcohol. Depending upon whether the residual HCl had been fully removed from the aforementioned cyanoalkylalkoxysilane, the aforementioned alkoxysilane mixture can be converted to an aminoalkylalkoxysilane by employing sponge nickel in accordance with standard hydrogenation procedures under pressure. The removal of residual HCl can be achieved by the employment of an HCl acceptor or the base catalyst can be utilized in amounts sufficient to neutralize the HCl as well as serve in the practice of the invention.

In calculating the amount of base catalyst required in the practice of the invention, it has sometimes been found expedient to allow for the presence of residual HCl to provide for a substantially neutral alkoxysilane mixture. It has been found that effective results can be achieved if there is utilized from about 0.1 to 5 gram equivalent weights of base catalyst, per gram equivalent weight of carbalkoxyalkyl radicals in the alkoxysilane mixture. Preferably, a proportion of from about 0.25 to 2 gram equivalents of base catalyst, per gram equivalent of carbalkoxyalkyl radicals can be utilized. In calculating the amount of ester contamination in the alkoxysilane mixture carbonyl absorption of the ester can be compared to a standard plot of carbonyl absorption based on various alkoxysilane mixtures each having a different ester concentration.

Distillation of the alkoxysilane mixture containing the base catalyst will provide for the separation of an overhead fraction consisting essentially of the organofunctionalsilane. In instances where the cyanoalkylalkoxysilane is converted to aminoalkylalkoxysilane, by the employment of sponge nickel and hydrogen at elevated temperatures and pressure, the removal of the alkoxysilane mixture from the solids can be readily achieved by filtration and the like.

In particular situations, the removal of the organofunctionalsilane from the alkoxysilane mixture also can be accomplished by flash distillation. The alkoxysilane mixture can be heated under reduced pressure to effect the rapid removal of an overhead fraction. In accordance with normal procedures however, the distillation can proceed in a stepwise manner providing for the recovering of an initial forecut of an organosilicate which is produced as a reaction by-product followed by the recovery of the desired ester free organofunctionalsilane. In instances where flash distillation is employed, the overhead fraction consists essentially of the organofunctionalsilane as well as minor amounts of the organosilicate which can be removed readily by a subsequent distillation of the overhead fraction.

In order that those skilled in the art will be better able to practice the invention, the following examples are given by way of illustration, and not by way of limitation. All parts are by weight.

Example 1

There were added 3.9 parts of sodium ethoxide in the form of a dry powder to a mixture while it was being stirred consisting of 288.7 parts of cyanoethyltriethoxysilane and 15.1 parts of β-carbethoxyethyltriethoxysilane. The mixture was then fractionated under reduced pressure. An overhead product was recovered at 114° C. and 15 mm. There was obtained a 92% yield of cyanoethyltriethoxysilane. Although carbethoxyethyltriethoxysilane can be distilled at 117° C. at 15 mm., the overhead fraction was contaminated with less than 0.6 mole percent of the ester based on the total moles of alkoxysilane. The amount of ester contamination was determined with a precalibrated ester-nitrile absorption curve.

Example 2

There was added 1.8 parts of sodium methoxide in the form of a dry powder to a mixture of 182 parts of gamma-aminopropyltriethoxysilane and 10 parts of carbethoxyethyltriethoxysilane. The mixture was distilled at 110° C. at 19 mm. and there was obtained a 95% recovery of gamma-aminopropyltriethoxysilane based on the total weight of alkoxysilane in the mixture. An infrared scan of the product showed that it was free of carbethoxyethyltriethoxysilane.

Example 3

Magnesium N,N-diethylamide was prepared by effecting reaction between equimolar amounts of diethylamine and ethyl magnesium bromide which was added dropwise to the amine in an ether solvent. During the addition, ethane was evolved. At the completion of the addition the resulting mixture was heated to reflux for ½ hour. There were then added 93 parts of a mixture composed of about 9.5 mole percent of carbethoxyethyldiethoxymethylsilane and 90.5 mole percent of cyanoethyldiethoxymethylsilane. During the addition, the mixture was heated to reflux. When the addition was completed, the mixture was refluxed for an additional hour. The mixture was then distilled under reduced pressure and 37 parts cyanoethyldiethoxymethylsilane was obtained having a boiling range between 93° C. to 95° C. at 11 mm. An infrared spectrum of the distilled sample showed that it was free of an ester contamination.

Example 4

There were added 30 parts of a mixture consisting of equal parts by weight of sodium hydride and mineral oil with stirring, to a mixture of 22 parts of diethylamine in benzene. A large evolution of gas resulted and then the reaction slowed down. There were then added to the mixture, 168 parts of an alkoxysilane mixture consisting of about 11 mole percent of carbethoxyethyldiethoxymethylsilane and about 89 mole percent of cyanoethylmethyldiethoxysilane. Upon distillation of the mixture there were obtained 83 parts of an overhead fraction boiling between 93° C. to 95° C. at 11 mm. It was cyanoethylmethyldiethoxysilane which was free of carbethoxyethylmethyldiethoxysilane, based on V.P.C. analysis.

While the foregoing examples have of necessity been limited to only a few of the very many variables within the scope of the present invention, it should be understood that the present invention provides for the recovery of a much broader class of organofunctionalalkylalkoxysilanes included by Formula 1 from a variety of alkoxysilane mixtures.

What I claim as new and desire to secure by Letters Patent of the United States is:

1. A method of distilling an alkoxysilane mixture comprising (A) an organofunctionalalkylalkoxysilane, and (B) a carbalkoxyalkylalkoxysilane to provide for the production of an overhead fraction comprising (A) which is substantially free of (B), which method comprises (1) distilling said alkoxysilane mixture in the presence of an effective amount of a base catalyst and (2) recovering an overhead fraction boiling within the temperature range of (A) which is a member selected from the class consisting of a cyanoalkylalkoxysilane and an aminoalkylalkoxysilane.

2. A method in accordance with claim 1 where the base catalyst is an alkali metal alkoxide.

3. A method in accordance with claim 1, in which the base catalyst is sodium methoxide.

4. A method in accordance with claim 1, in which the organofunctionalalkylalkoxysilane is a cyanoalkylalkoxysilane.

5. A method in accordance with claim 1, in which the organofunctionalalkylalkoxysilane is an aminoalkylalkoxysilane.

6. A method in accordance with claim 1, in which the organofunctionalalkylalkoxysilane is beta-cyanoethyltriethoxysilane.

7. A method in accordance with claim 1, in which the organofunctionalalkylalkoxysilane is gamma-aminopropyltriethoxysilane.

8. A method in accordance with claim 1, in which the base catalyst is magnesium N,N-diethylamide.

9. A method in accordance with claim 1, where there is utilized a proportion of from about 0.25 to 2 gram equivalents weight of base catalyst per gram equivalent weight of carbalkoxyalkyl radicals in the alkoxysilane mixture.

References Cited

UNITED STATES PATENTS

| | | | |
|---|---|---|---|
| 2,957,899 | 10/1960 | Black et al. | 260—448.8 |
| 3,008,975 | 11/1961 | Schubert | 260—448.8 |
| 3,105,086 | 9/1963 | Ryan | 260—448.8 |
| 3,112,332 | 11/1963 | Pike | 260—448.8 |
| 3,119,855 | 1/1964 | Bailey et al. | 260—448.8 |

WILBUR L. BASCOMB, Jr., *Primary Examiner.*

U.S. Cl. X.R.

203—37, 38, 57, 60, 88, 91; 260—448.8